(12) United States Patent
Belogolovyi et al.

(10) Patent No.: US 7,778,334 B2
(45) Date of Patent: Aug. 17, 2010

(54) MODULATION SCHEME FOR COMMUNICATION ENVIRONMENTS

(75) Inventors: Andrey V. Belogolovyi, Saint Petersburg (RU); Vladislav A. Chernyshev, Saint Petersburg (RU); Felix A. Taubin, Saint Petersburg (RU)

(73) Assignee: Intel Corporation, Santa Clara, CA (US)

( * ) Notice: Subject to any disclaimer, the term of this patent is extended or adjusted under 35 U.S.C. 154(b) by 1156 days.

(21) Appl. No.: 10/576,171

(22) PCT Filed: May 18, 2005

(86) PCT No.: PCT/RU2005/000272

§ 371 (c)(1),
(2), (4) Date: Apr. 18, 2006

(87) PCT Pub. No.: WO2006/123963

PCT Pub. Date: Nov. 23, 2006

(65) Prior Publication Data

US 2009/0010318 A1    Jan. 8, 2009

(51) Int. Cl.
*H04K 1/10* (2006.01)
*H03K 7/02* (2006.01)
(52) U.S. Cl. ..................... 375/260; 375/353
(58) Field of Classification Search .......... 375/260, 375/261, 262, 264, 265, 295, 298, 353; 714/752
See application file for complete search history.

(56) References Cited

U.S. PATENT DOCUMENTS

| | | | | |
|---|---|---|---|---|
| 5,408,502 | A * | 4/1995 | How | 375/340 |
| 7,221,714 | B2 * | 5/2007 | Shen et al. | 375/265 |
| 7,577,207 | B2 * | 8/2009 | Eroz et al. | 375/261 |
| 2004/0264599 | A1 * | 12/2004 | Lliev | 375/298 |
| 2006/0078059 | A1 * | 4/2006 | Ok et al. | 375/260 |
| 2008/0215652 | A1 * | 9/2008 | Lin et al. | 708/400 |
| 2008/0263426 | A1 * | 10/2008 | Zaleski et al. | 714/752 |

FOREIGN PATENT DOCUMENTS

WO    WO 03/021852 A2    3/2003
WO    WO 2006/123963 A1    11/2006

OTHER PUBLICATIONS

International Application No. PCT/RU2005/000272, International Preliminary Report on Patenability, dated Dec. 28, 2007, 8 pages.

(Continued)

*Primary Examiner*—Don N Vo
(74) *Attorney, Agent, or Firm*—Blakely, Sokoloff, Taylor & Zafman LLP

(57) ABSTRACT

According to an aspect of the present invention, a symbol corresponding to a combination may be determined from a symbol set comprising at least sixteen PAM symbols. A sample such as a pulse may be generated based on the symbol value and a train of such pulses may be transmitted at a rate of at least 10 giga bits per second over a communication medium comprising, for example, a twisted copper cable. The received signal may be demodulated based on the empirically determined reliability values.

24 Claims, 7 Drawing Sheets

OTHER PUBLICATIONS

Communication of European Publication, Application No. PCT/RU205000272, dated Apr. 1, 2008, 1 page.

Communication pursuant to Article 94(3) EPC, First Office Action, Application No. 05 817 742.9-1525, dated Feb. 29, 2008, 3 pages.

Transmission & Multiplexing (TM); Access Transmission System on Metallic Acess Cables; Symmetric Single Pair High Bitrate Digital Subscriber Line (SDSL); ETSI TS 101 524 V1.3.1; 2005.

Int'l Application No. PCT/RU2005/000272 Int'l Search Report & Written Opinion dated Mar. 9, 2006.

Farese, Luca, Communication pursuant to Article 94(3) EPC, Jul. 4, 2008, 3 pages, Application No. 05 817 742.9-1525, European Patent Office, Berlin, Germany.

Farese, Luca, Communication pursuant to Article 94(3) EPC, Nov. 11, 2008, 4 pages, Application No. 05 817 742.9-1525, European Patent Office, Berlin, Germany.

Farese, Luca, Communication pursuant to Article 94(3) EPC, Feb. 16, 2009, 4 pages, Application No. 05 817 742.9-1525, European Patent Office, Berlin, Germany.

Farese, Luca, Communication pursuant to Article 94(3) EPC, May 7, 2009, 3 pages, Application No. 05 817 742.9-1525, European Patent Office, Berlin, Germany.

Chekanova, N.S., Official Action, Jun. 30, 2009, 3 pages, Application No. 2007146998, Russian Patent and Trademark Office.

\* cited by examiner

| UN-CODED PORTION | CODED PORTION | SYMBOL |
|---|---|---|
| 0 | 000 | +15 |
| 0 | 001 | +13 |
| 0 | 011 | +11 |
| 0 | 010 | +9 |
| 0 | 110 | +7 |
| 0 | 111 | +5 |
| 0 | 101 | +3 |
| 0 | 100 | +1 |
| 1 | 000 | -1 |
| 1 | 001 | -3 |
| 1 | 011 | -5 |
| 1 | 010 | -7 |
| 1 | 110 | -9 |
| 1 | 111 | -11 |
| 1 | 101 | -13 |
| 1 | 100 | -15 |

FIG. 3

MODULATION SCHEME FOR COMMUNICATION ENVIRONMENTS

CROSS-REFERENCE TO RELATED APPLICATION

This application is a National Phase application of, and claims priority to, International Application No. PCT/RU2005/000272, filed May 18, 2005, entitled "A MODULATION SCHEME FOR COMMUNICATION ENVIRONMENTS".

BACKGROUND

A communication environment generally refers to a group of interconnected wired and/or wireless devices such as, for example, laptops, mobile phones, servers, fax machines, printers, etc., which may send/receive data. The devices may transfer data in the form of a signal over a communication channel provisioned between devices. The devices may process the data to efficiently transfer the data over a communication channel. Such processing may include, for example, coding and modulating.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 illustrates an embodiment of a bit-to-symbol mapping table used by the mapper of FIG. 2.

DETAILED DESCRIPTION

The following description describes a communication environment. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
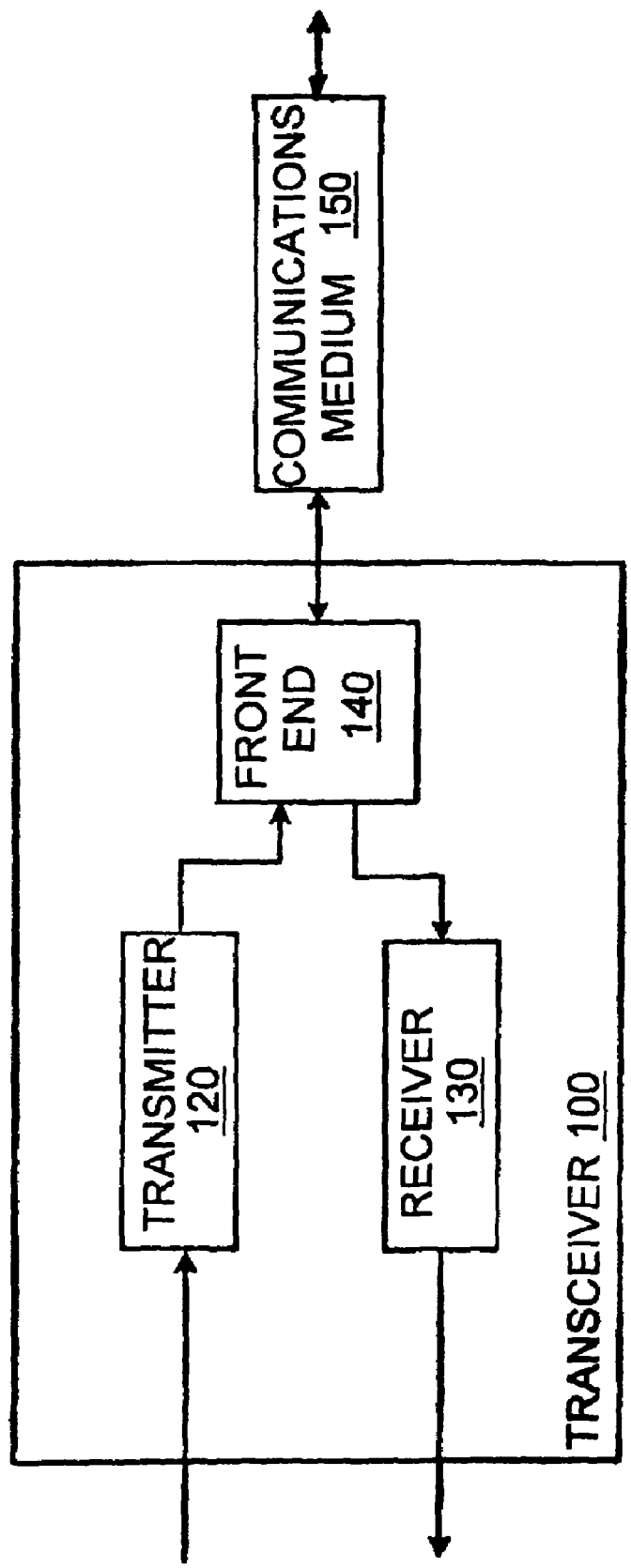
FIG. 1 illustrates an embodiment of a communication system comprising a transceiver and a communication channel.

An embodiment of a communication system is illustrated in FIG. 1. The communication system may comprise a transceiver 100 and a communication medium 150. The transceiver 100 may transmit and receive signals on the communication medium 150. The communication medium 150 may represent a wired medium such as a twisted copper pair, optical fiber, and wireless medium such as an air medium. The transceiver 100 may be used, for example, in network interface cards (NIC), physical layer devices (PHYs) etc. In one embodiment, the transceiver 100 may comprise a transmitter 120, a receiver 130, and a front end 140.

The receiver 130 may process a received signal before sending the extracted data bits for further processing, for example, to a switch, router, or any device configured to receive data bits. In one embodiment, the receiver 130 may decode the signal and extract the data bits. The receiver 130 may receive, for example, a pulse amplitude modulated (PAM-16) symbol, process the symbol using techniques such as descrambling and error correcting, and then send the extracted data bits for further processing.

The front end device 140 may comprise one or more interface units or ports to couple the transmitter 120 and the receiver 130 to the communication medium 150. The front end device 140 may comprise data converters, amplifiers, and such other electronic circuits. In one embodiment, the front device 140 may receive a stream of symbols from the transmitter 120, convert the symbols into an appropriate signal such as a pulse using a data converter, and may transmit the signals on the communication medium 150. Similarly, the front end device 140 may convert a received signal into an appropriate format for the receiver 130.

The transmitter 120 may receive a bit stream, process the bit stream to generate one or more symbols, and then provide the symbols to the front end device 140. In one embodiment, the transmitter 120 may process the bit stream using techniques such as framing, scrambling, encoding, mapping, and pre-coding. The transmitter 120 may modulate the bit stream, for example, using a pulse amplitude modulation (PAM) technique to transmit two or more bits of the bit stream in the form of a symbol corresponding to a voltage level of the pulse. Modulation techniques may be used, for example, to efficiently use the channel bandwidth. The transmitter 120 may include forward error correction code to facilitate error detection and correction at the receiving end, before transmitting the signal over the communication medium 150.

In one embodiment, during the start-up, a receiver that may eventually receive signals from the transmitter 120 may measure the signal-to-noise ratio (SNR) corresponding to the communication medium 150 and may then determine the allowable bit error rate (BER) at the measured SNR. The transmitter 120 may receive, from the receiver, the characteristics of the communication medium 150 before transmitting the information signal. In one embodiment, the transmitter 120 may determine the PAM levels or the number of symbols in a symbol set based on the allowable bit error rate at the measured SNR.

Figure 2:
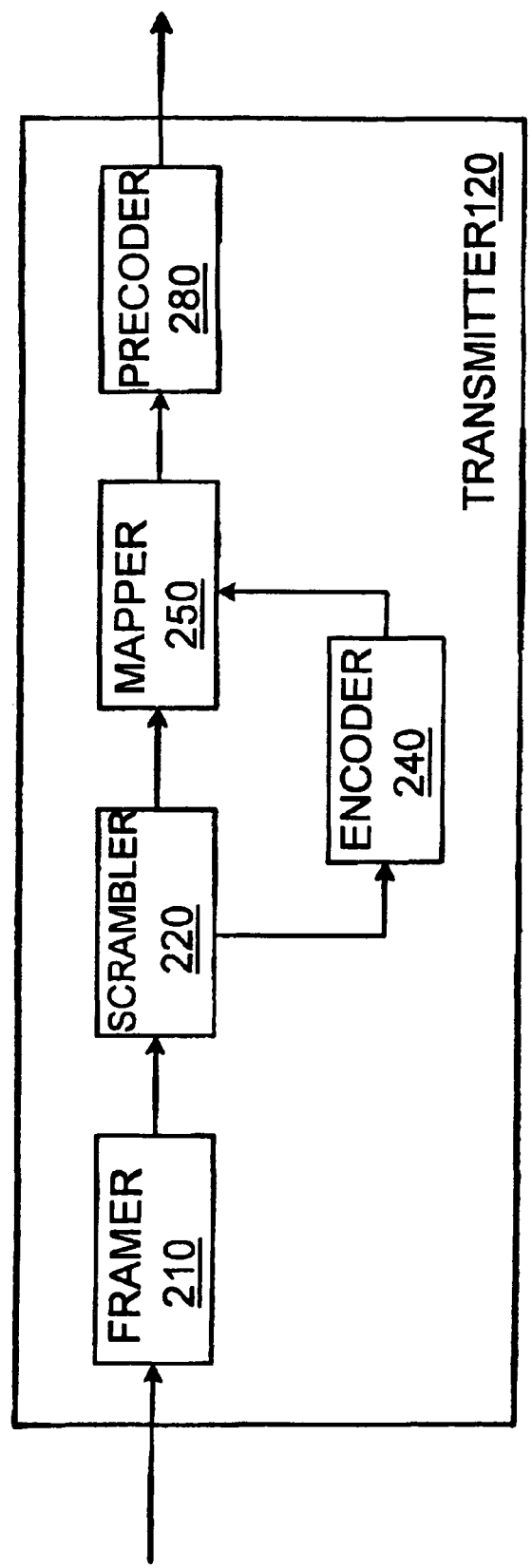
FIG. 2 illustrates an embodiment of a transmitter of the transceiver of FIG. 1.

An embodiment of the transmitter 120 is illustrated in FIG. 2. The transmitter 120 may comprise a framer 210, a scrambler 220, an encoder 240, a mapper 250, and a pre-coder 280.

The framer 210 may receive the bit stream and generate one or more frames by dividing the bit stream into smaller pieces of pre-specified size and adding control bits. The framer 210 may add control bits such as synchronization bits, cyclic redundancy check bits, and stuffing bits to cause frame alignment, error detection, and to mark the frame boundaries. In one embodiment, each frame may comprise a payload bits and control bits.

The scrambler 220 may receive the frames, scramble the payload bits, and generate one or more scrambled frames. The scrambler 220 may send first K bits of a scrambled frame to the encoder 240 and the remaining un-coded bits (un-coded bit stream) of the scrambled frame to the mapper 250. In one embodiment, the scrambler 220 may generate scrambled frames using filter structures that may convolve the payload bits in the scrambled frames.

The encoder 240 may encode the first K bits using techniques such as low density parity check (LDPC) coding or a convolution coding or such other coding techniques. In one embodiment, the encoder 240 may receive K bits from the scrambler 220 and generate a coded bit stream comprising N bits (N greater than K) using LDPC coding. The encoder 240 may send the coded bit stream of N bits to the mapper 250. The encoder 240 may generate the coded bit stream comprising N bits by adding (N–K) bits to the K bits to enable forward error correction at the receiver side of another transceiver. For example, the encoder 240 may receive 1020 bits (=K) and generate 1344 bits (=N) by performing operations such as modulo 2 multiplication of 1020 bits and the values of a LDPC code generator matrix. LDPC is described at least in R. G. Gallager, Low-density parity-check codes, IRE Trans. Inform. Theory, vol. 8, pp. 21-28, January 1962.

The mapper 250 may generate a combination by combining the bits selected from the coded bit stream of the encoder 240 and the un-coded bit stream of the scrambler 220. The mapper 250 may generate a symbol corresponding to the combination using a modulation technique such as the pulse amplitude modulation (PAM). Each combination may be mapped into a symbol and the mapper 250 may generate a stream of symbols corresponding to the combinations.

In one embodiment, the mapper 250 may receive N/3 bits of the un-coded bit stream and N bits of the coded bit stream and determine a symbol using, for example, PAM-16 scheme. For example, the mapper 250 may select one bit from the un-coded bit stream, three bits from the coded bit stream, generate a combination comprising four bits, and determine a symbol corresponding to the combination. In one embodiment, the mapper 250 may produce N/3 combinations and map each combination may correspond to one of the 16 symbols.

In one embodiment, the mapper 250 may generate N/3 PAM symbols for each scrambled frame comprising K+N/3 bits. For example, the mapper 250 may generate 448 symbols if the value of N equals 1344. Such a modulation technique may enable four data bits to be transmitted per symbol as compared to three bits/symbol in the case of a PAM-8 modulation scheme. Thus, using PAM-16 scheme may reduce the sampling rates and may thus enable lesser computational resources to be used at the corresponding receiver.

In one embodiment, the number of symbols or PAM levels may be chosen based on an allowable bit error rate at the measured signal-to-noise ratio (SNR) of the communication channel 150. In one embodiment, the mapper 250 may generate combinations comprising the un-coded bits and the coded bits, for example, to maintain the bit error rate value below the allowable bit error rate value, increase the transmission speed, and decrease the sampling rate.

The number of the un-coded bits and the coded bits may be selected based on, for example, transmission speed, allowable error floor values etc. In one embodiment, the transmission speed may be increased by increasing the number of information bits in each combination. The number of information bits may be increased by combining both the un-coded bits and the coded bits to produce a combination. In one embodiment, the information bits transmitted/symbol may be determined using Equation (1) shown below.

$$\text{Information bits/symbol} = \text{coded bits of the combination} * \text{code rate } R + \text{un-coded bits of the combination} \quad \text{Equation (1)}$$

The code rate R may equal the ratio of the bits provided as input to the encoder 240 and the bits received as output from the encoder 240. In the above example, the code rate R may equal 0.75892 (=1020/1344) approximately. The mapper 250 may generate 3.27 (=3×0.75892+1) information bits/symbol by choosing one un-coded bit and three coded bits. However, if all four bits are selected from the coded bit stream the mapper 250 may generate only 3.03 (=4×0.75892) information bits/symbol. Thus, the mapper 250 may produce a combination by selecting one bit and three bits respectively from the un-coded bit stream and the coded bit stream. However, the number of un-coded bits to be included in the combination may be determined based on the allowable bit error rate (BER) at the measured SNR of the communication medium 150.

The sampling rate SR corresponding to a data rate of 10 Gigabit transmission may be computed using Equation (2) shown below.

$$SR = (10 \times 10\exp+9)/(4 * \text{Information bits/symbol}) \quad \text{Equation (2)}$$

The exp, +, ×, and / respectively represent exponential, addition, multiplication and division operators. In the above example, the sampling rate SR may equal 762 MHz ((10×10 exp+9)/(4*3.27)). Using PAM-16 modulation may result in a SR that is substantially close to an optimum sampling rate point of a copper medium on a curve drawn with bit error rate and the SNR as the parameters. The sampling rate corresponding to other PAM schemes such as PAM-8, PAM-12 or PAM-25 may have a larger deviation from the optimum sampling rate. As the sampling rate is substantially close to optimum value the computational resources that may be employed to process the PAM-16 modulated signal may be less compared to other PAM schemes.

The mapper 250 may store, for example, a bit-to-symbol mapping table 300 comprising one or more entries. Each entry, for example, may comprise an un-coded portion, coded portion, and a corresponding symbol. In one embodiment, the mapper 250 may comprise a content addressable memory, which may perform comparisons to produce a corresponding symbol.

In one embodiment, the mapper 250 may use the PAM-16 scheme and the number of symbols may equal sixteen. Each of the sixteen symbols corresponding to a combination comprising four bits (one un-coded bit and three coded bits) may correspond to a value such as +15, +13, +11–13, and −15.

In one example, the mapper 250 may select three bits from the coded bit stream of 1344 bits and one bit from the un-coded bit stream of 448 bits. The mapper 250 may compare the first bit of the combination representing the un-coded bit with the corresponding bit in the un-coded portion of the bit-to-symbol mapping table and the second, third, and the fourth bits of the combination representing the coded bits with the respective bits in the coded portion of the bit-to-symbol mapping table.

For example, the combination may equal 0001, the un-coded bit may equal 0 (first bit from left), and the coded bits may equal 001 (second, third, and fourth bits from left). The mapper 250 may use the combination equaling 0001 as a key, search the mapping table for a matching entry that equals 0001, and then produce a symbol corresponding to the matching entry. For example, the symbol corresponding to the combination of 0001 may equal a value of +13. The mapper 250 may then send the symbol to the pre-coder 280.

The pre-coder 280 may receive a stream of symbols from the mapper 250 and may perform operations to substantially reduce the unwanted effects of the communication medium 150. The pre-coder 280 may use the allowable bit rate and the measured SNR of the communication medium 150 to perform operations such as linear equalization.

The pre-coder 280 may use pre-coding filters to perform operations such as linear equalization to reduce the unwanted effect that may be caused due to undesired characteristics of the communication medium 150. Such an approach may cause the signal to be transmitted with higher signal to noise ratio (SNR) values. In one embodiment, the pre-coder 280 may use Tomlinson-Harashima pre-coder (THP).

An embodiment of the bit-to-symbol mapping table 300 is illustrated in FIG. 3. The bit-to-symbol mapping table 300 may be stored in the mapper 250 and the table 300 may comprise three columns 301, 304, and 309 respectively representing the un-coded portion, the coded portion, and the corresponding symbol and sixteen rows 310 through 390.

The row 315 is shown comprising {0, 000, and +15} respectively representing the un-coded portion, the coded-portion, and the corresponding symbol. For example, if the mapper 250 receives an un-coded bit equaling 0 and the coded bits equaling 000, the mapper 250 may produce a combination equaling 0000, which may be used as a key to search the bit-to-symbol mapping table 300 for an entry equaling 0000. As may be observed, the combination 0000 matches with the entry in the row 315 and the corresponding symbol equals +15. The symbol equaling +15 may be sent to the pre-coder 280.

The un-coded-portion, the coded portion, and the symbol in rows 320-390 respectively equal {0, 001, +13}, {0, 011, +11}, {0, 010, +9}, {0, 110, +7}, {0, 111, +5}, {0, 101, +3}, {0, 100, +1}, {1, 100, −1}, {1, 101, −3}, {0, 111, −5}, {1, 110, −7}, {1, 010, −9}, {0, 011, −11}, {0, 001, −13}, and {1, 000, −15}. The mapper 250 may use the entries to generate a corresponding symbol.

Figure 4:
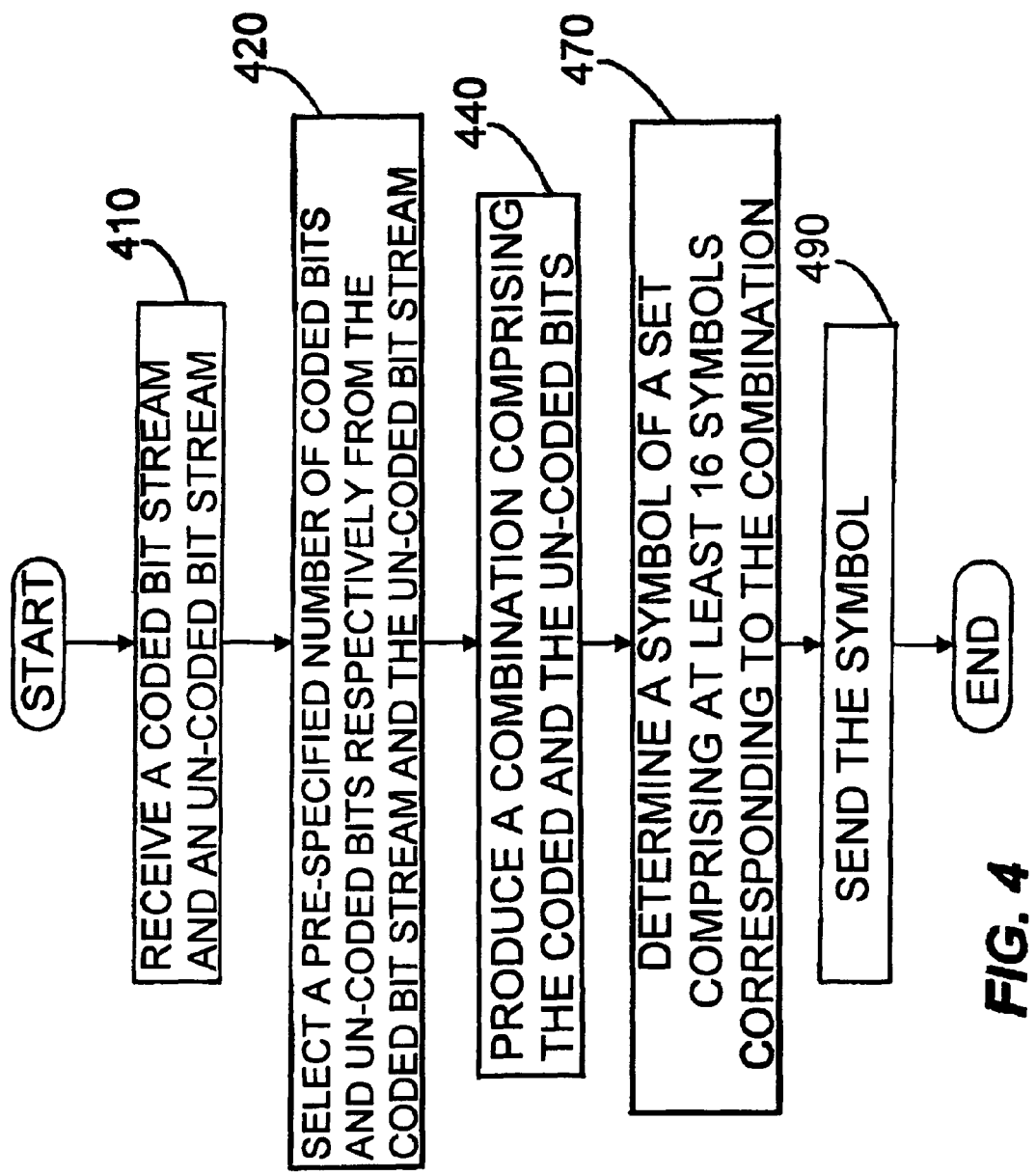
FIG. 4 depicts a flow-chart illustrating an operation of the mapper of FIG. 2.

FIG. 4 illustrates operation of an embodiment of the mapper 250. In block 410, the mapper 250 may receive an un-coded bit stream and a coded bit stream from the scrambler 220 and the encoder 240. In one embodiment, the encoder 240 may generate a coded bit stream comprising N bits (=1344) bits after receiving 1020 bits from the scrambler 220 and the scrambler 220 may send an un-coded bit stream comprising N/3 bits (=448) to the mapper 250.

In block 420, the mapper 250 may select a pre-specified number of coded bits and un-coded bits respectively from a coded bit stream and an un-coded bit stream. In one embodiment, the mapper 250 may select one bit from the un-coded bit stream and three bits from the coded bit stream.

In block 440, the mapper 250 may produce a combination comprising the un-coded bits and the coded bits. In one embodiment, the mapper 250 may produce a combination 0001 after selecting, for example, a 0 and 001 respectively from the un-coded bit stream and the coded bit stream.

In block 470, the mapper 250 may determine a symbol corresponding to the combination. In one embodiment, the mapper 250 may compare the combination with each entry in the bit-to-symbol mapping table 300 until a matching entry is found and the symbol corresponding to the matching entry may represent the corresponding combination. In one embodiment, entries (0000), (0001), (0011), (0010), (0110), (0111), (0101), (0100), (1000), (1001), (1011), (1010), (1110), (1111), (1101), and (1100) may respectively correspond to symbols +15, +13, +11, +9, +7, +5, +3, +1, −1, −3, −5, −7, −9, −11, −13, and −15.

In block 490, the mapper 250 may send the corresponding symbol. In one embodiment, the mapper 250 may send one or more symbols to the pre-coder 280.

Thus, the transmitter 120 may generate a symbol enabling transfer of information at higher speeds in communication environments using technologies such as 10 giga bit Ethernet (10 gbE) or more.

Figure 5A:
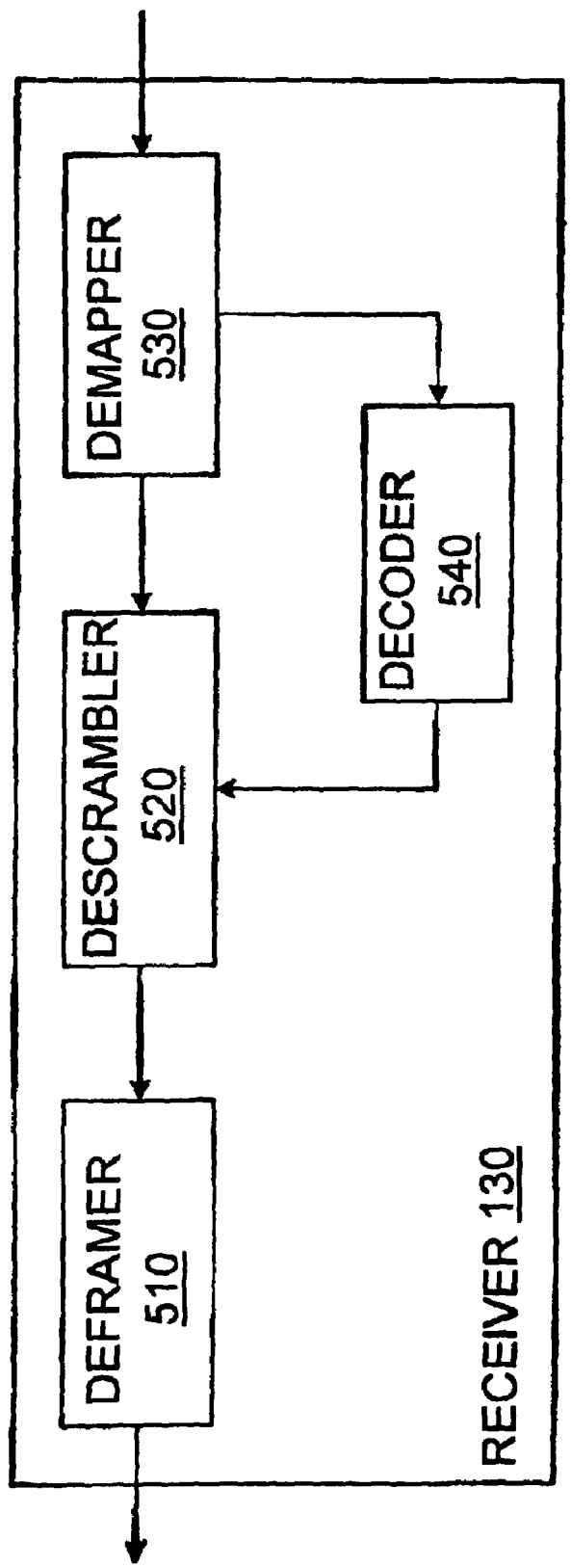
FIG. 5A illustrates an embodiment of a receiver of FIG. 1

An embodiment of the receiver 130 is illustrated in FIG. 5A. The receiver 130 may comprise a de-framer 510, a descrambler 520, a de-mapper 530, and a decoder 540.

The de-mapper 530 may receive a symbol from the communication medium 150 and generate a stream of coded bits and un-coded bits. In one embodiment, the de-mapper 530 may receive N/3 symbols; generate an un-coded bit stream comprising N/3 bits, and a coded bit stream comprising N bits. For example, the de-mapper 530 may perform inverse operation of the mapper 250 to determine a combination corresponding to the symbol, send the un-coded bit of each combination to the descrambler 520 and the remaining coded bits of each combination to the decoder 540.

The decoder 540 may receive the coded bits, extract the bits from the coded bits by removing the redundant bits after performing operations such as error detection and correction, and send the extracted bits to the descrambler 520. In one embodiment, the decoder 540 may receive N coded bits, extract K bits (K<N) from the coded bit stream, and send K bits to the descrambler 520.

The decoder 540 may extract K bits from the coded bit stream based on a reliability assignment corresponding to each bit of the coded bit stream. The decoder 540 may improve decoding performance, for example, by minimizing errors using the reliability assignment. The decoding performance may, for example, represent the degree of confidence that each bit may be extracted with minimal errors that may satisfy the allowable error levels. The reliability assignments based on log-likelihood ratios (LLR) allow the decoder 540 to extract the bits with minimum errors. The LLR based assignments may be computationally intensive. In one embodiment, the reliability assignment may be performed based on the scheme described below with reference to FIG. 5B.

The descrambler 520 may receive un-coded bit streams and the extracted bit stream respectively from the de-mapper 530 and the decoder 540, descramble the received bits to generate payload bits, generate frames, and send the frames to the de-framer 510. In one embodiment, the descrambler 520 may generate payload bits using filter structures that may perform inverse operations performed by the scrambler 220.

The de-framer 510 may receive the frames and generate a bit stream representing the data. The de-framer 510 may remove control bits such as start bits and end bits, synchronizing bits, and stuff bits. The de-framer 510 may then send the bit stream representing the data to an adjacent device such as a router, a switch, a computer system, a handheld device, mobile device, or any such device intended to receive bit stream from the receiver 130 of transceiver 100.

Figure 5B:
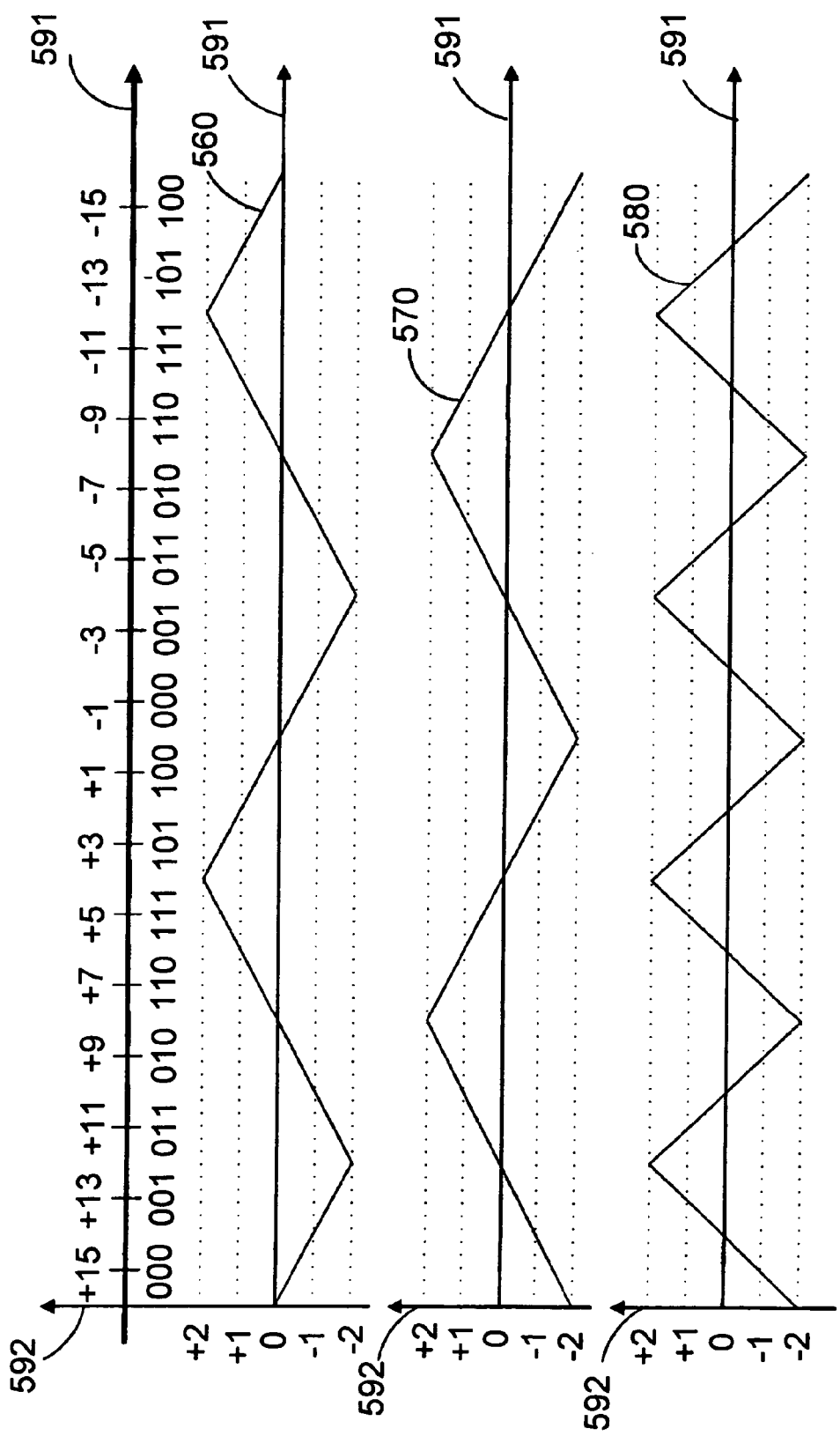
FIG. 5B depicts a reliability assignment used by the receiver of FIG. 5A.

An embodiment of reliability assignment used by the receiver 130 is depicted in FIG. 5B. The reliability assignment graph is shown comprising a most significant bit (MSB) or Bit-2 reliability assignment curve 560, Bit-1 reliability assignment curve 570, least significant (LSB) or Bit-0 reliability assignment curve 580 plotted with reference to symbol axis 591, and reliability axis 592.

The reliability axis 592 is shown indicating reliability values in the range (+2, to −2) that may be assigned to the corresponding bit based on the symbol being decoded. For example, if the receiver 130 receives a symbol equaling +13 (0001), the decoder 540 may decode the coded bits 0, 0, and 1 (MSB, Bit-1, and LSB respectively) of coded bits 001 with reliability values of −1.5, −0.5 and +1 respectively. Similarly, for a symbol −11, the decoder 540 may decode the bits 1, 1, and 1 (MSB, Bit-1, and LSB respectively) of coded bits 111 with reliability values of +1.5, +0.5, and +1 respectively. The reliability assignment based on the reliability assignment graph may be efficient in terms of usage of computational resources.

Figure 6:
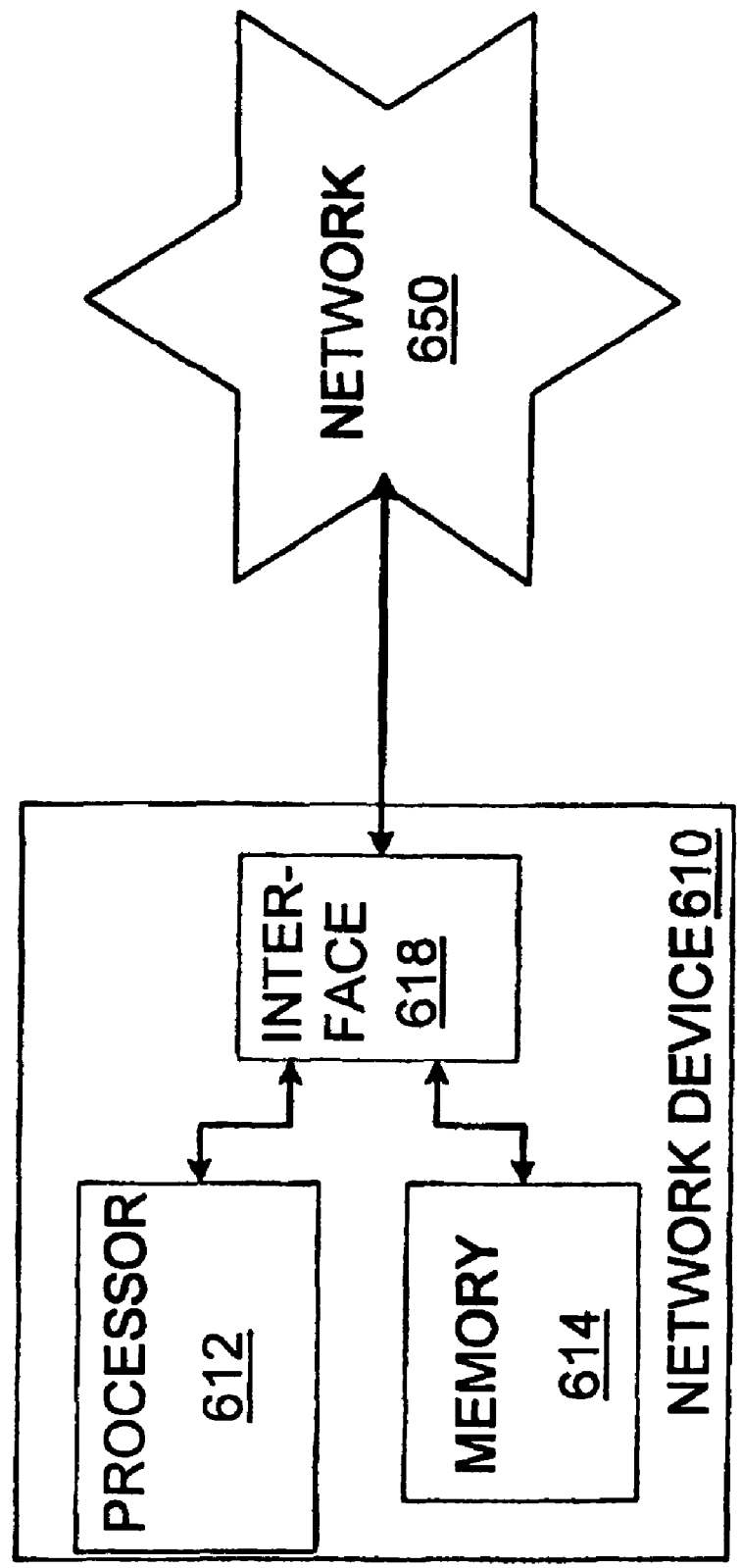
FIG. 6 illustrates an embodiment of a network system.

An embodiment of a network system 600 is illustrated in FIG. 6. The network system 600 may comprise a network device 610 and a network 650. The network device 610 may correspond to a router, laptop computer, desktop computer, a hand held device, network interface card or any such devices that may be coupled to the network 650.

The network 650 may comprise one or more intermediate devices such as switches and routers, which may receive, process, and send the packets to an appropriate intermediate device. The network 650 may enable network devices such as the network device 610 to transmit and/or receive data. The intermediate devices of the network 650 may be configured to support TCP/IP, ATM and any such communication protocols. The network 650 may be coupled to the network devices such as the network device 610 via communication medium that may transfer packets corresponding to technologies such as 10 G Ethernet.

The network device 610 may generate one or more packets and send the packets to other network devices coupled to the network 650. The network device 610 may receive packets from other network devices via the network 650. In one embodiment, the network device 610 may comprise a processor 612, memory 614, and a network interface 618. The processor 612 may provide the network interface with the bit stream in response to executing instructions and the memory 614 may store the instructions executed by the processor. The network interface 618 may comprise, for example, a network interface card embodying a transceiver such as transceiver 100.

In one embodiment, the transceiver 100 may communicate with the network 650 in accordance with the evolving 10GBase-T standard as defined by the IEEE 802.3an series of standards, however, other standards may be used as well. In some embodiments, the transceiver 100 may communicate with the network 650 using any type of medium such as but not limited to twisted pairs of copper wire, optic channels, wireless channels, power-line channels, acoustic/sonar channels, printed circuit board (PCB), backplanes, coaxial cable, or any other medium. For example, the communication medium 150 may be category 5, 6, 6a, or 7 network cabling and/or any other shielded or unshielded cabling.

The transceiver 100 may process the bit stream received from applications such as an e-mail or a file transfer application executed on the processor 612. A transmitter such as the transmitter 120 of transceiver 100 may receive the bit stream and generate symbols based on PAM-16 modulation technique as described above. The transmitter 120 may send the symbols to front end devices, which may convert the symbol into a corresponding signal such as amplitude modulated pulses and the signal may then be sent on a communication medium such as an Ethernet medium.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   receiving a bit stream,
   generating a coded bit stream of N bits by encoding a first portion of K bits of the bit stream using low density parity check coding technique and an un-coded bit stream of N/3 bits from a second portion of the bit stream,
   producing a combination by selecting at least N1 bits from the coded bit stream and N1/3 bits from the un-coded bit stream;
   determining a symbol, using a pulse amplitude modulation PAM-16 scheme, corresponding to the combination from a symbol set comprising at least sixteen symbols, wherein information bits in each symbol is based on a code rate determined using size of the first portion and size of the coded bit stream; and
   transmitting a signal corresponding to the symbol at a rate of at least 10 giga bits per second over a communication medium.

2. The method of claim 1, wherein the combination comprises four bits, wherein one bit is selected from the un-coded bit stream of N/3 bits and three bits are selected from the coded bit stream of N bits.

3. The method of claim 1, wherein determining the symbol comprises selecting the symbol based on a bit-to-symbol mapping table.

4. The method of claim 3, wherein selecting comprises searching for a matching entry corresponding to the combination and producing the symbol corresponding to the matching entry.

5. The method of claim 1 further comprises:
   decoding the coded bit stream to generate an extracted bit stream based on a reliability assignment corresponding to each bit of the coded bit stream, and
   generating a bit stream representing data, and sending the bit stream.

6. The method of claim 5, wherein the reliability assignment values are chosen based on the bit position of the coded bit stream corresponding to the symbol being decoded and one or more pre-defined reliability assignment values.

7. An apparatus comprising:
a transmitter is arranged to receive an input bit stream, to generate a coded bit stream of N bits by encoding a first portion of K bits of the input bit stream using low density parity check coding technique and an un-coded bit stream of N/3 bits a second portion of the input bit stream, and to produce a combination by selecting at least N1 bits from the coded bit stream and N1/3 bits from the un-coded bit stream, to determine a symbol, using a pulse amplitude modulation PAM-16 scheme, corresponding to the combination from a symbol set, wherein the symbol set comprises at least sixteen symbols, wherein information bits in each symbol is based on a code rate determined using size of the first portion and size of the coded bit stream,
a receiver to demodulate based on a reliability assignment, and
a front end device to transmit a signal corresponding to the symbol at a rate of at least 10 giga bits per second over a communication medium.

8. The apparatus of claim 7 the transmitter further comprises a mapper, wherein the mapper is to receive the coded bit stream comprising N bits and the un-coded bit stream comprising N/3 bits.

9. The apparatus of claim 8 further comprises an encoder to generate N bits by encoding the first portion of K bits using low density parity check coding technique.

10. The apparatus of claim 7, wherein the mapper is to generate the combination by selecting one bit out of the N/3 bits and three bits out of the N bits.

11. The apparatus of claim 7, wherein the mapper is to determine the symbol by selecting the symbol based on the bit-to-symbol mapping table.

12. The apparatus of claim 11 the mapper further comprises a content addressable memory to search a matching entry corresponding to the combination and to produce the symbol corresponding to the matching entry.

13. The apparatus of claim 7 the receiver further comprises:
a de-mapper, wherein the de-mapper is to generate the coded bit stream and the un-coded bit stream from a received signal;
a decoder to decode a coded bit stream to generate an extracted bit stream based on a reliability assignment values determined corresponding to each bit of the coded bit stream, and
a de-framer to generate a bit stream representing data.

14. The apparatus of claim 13, wherein the reliability assignment values are chosen based on the bit position of the coded bit stream corresponding to the symbol being decoded and one or more pre-defined reliability assignment values.

15. The apparatus of claim 7 includes a transceiver.

16. A system comprising:
a network interface to generate and transfer a signal that is representative of a bit stream and that comprises symbols selected from at least one of sixteen symbols,
a processor to provide the network interface with the bit stream in response to executing instructions,
a memory to store the instructions executed by the processor,
the network interface further comprises a transmitter to receive a bit stream, to generate a coded bit stream of N bits by encoding a first portion of K bits of the input bit stream using low density parity check coding technique and an un-coded bit stream of N/3 bits from a second portion of the bit stream and to produce a combination by selecting at least N1 bits from the coded bit stream and N1/3 bits from the un-coded bit stream, to determine a symbol, using a pulse amplitude modulation PAM-16 scheme, corresponding to the combination from a symbol set, wherein the symbol set comprises at least sixteen symbols, wherein information bits in each symbol is based on a code rate determined using size of the first portion and size of the coded bit stream, and
a front end device to transmit a signal corresponding to the symbol at a rate of at least 10 giga bits per second over a communication medium.

17. The system of claim 16, wherein the network interface is to generate the signal as a pulse amplitude modulated signal having a rate of at least 10 giga bits per second.

18. The system of claim 17, the transmitter further comprises a mapper, wherein the mapper is to receive the coded bit stream comprising N bits and the un-coded bit stream comprising N/3 bits.

19. The system of claim 17, wherein the mapper is to generate the combination by selecting one bit out of the N/3 bits and three bits out of the N bits.

20. The system of claim 17, wherein the mapper is to determine the symbol by selecting the symbol based on the bit-to-symbol mapping table.

21. The system of claim 17 the mapper further comprises a content addressable memory to search a matching entry corresponding to the combination and to produce the symbol corresponding to the matching entry.

22. The system of claim 17 the network interface further comprises a receiver comprising:
a de-mapper to generate the coded bit stream and the un-coded bit stream from a received signal;
a decoder to decode the coded bit stream to generate an extracted bit stream based on reliability assignment values determined corresponding to each bit of the coded bit stream, and
a de-framer to generate a bit stream representing data.

23. The system of claim 17 the network interface includes a network interface card.

24. The system of claim 23 the network interface card includes logic capable of communicating at least in accordance with 10GBase-T standard.

* * * * *